United States Patent [19]

Buckley

[11] Patent Number: 4,550,344

[45] Date of Patent: Oct. 29, 1985

[54] CATHODE RAY TUBE WITH COMPOSITE MOUNTING STRUCTURE

[75] Inventor: Michael J. Buckley, Geneva, N.Y.

[73] Assignee: North American Philips Consumer Electronics Corp., New York, N.Y.

[21] Appl. No.: 423,909

[22] Filed: Sep. 27, 1982

[51] Int. Cl.⁴ .............................................. H04N 5/645

[52] U.S. Cl. .................................... 358/248; 358/246; 220/2.1 A

[58] Field of Search ............................... 358/246, 248; 220/2.1 A, 2.3 A

[56] References Cited

U.S. PATENT DOCUMENTS

| | | | |
|---|---|---|---|
| 3,651,257 | 3/1972 | Goetz | 358/248 |
| 4,080,631 | 3/1978 | Puhak | 358/248 |
| 4,158,419 | 6/1979 | Nolan | 358/246 |
| 4,169,274 | 9/1979 | Larson | 358/246 |
| 4,210,935 | 7/1980 | Mitchell | 358/246 |
| 4,214,142 | 7/1980 | Crosby | 219/86.25 |
| 4,222,075 | 9/1980 | Mitchell | 358/246 |
| 4,342,049 | 7/1982 | Dickinson | 358/246 |
| 4,356,515 | 10/1982 | Sumiyoshi | 358/246 |
| 4,360,837 | 11/1982 | Kreidler | 358/246 |
| 4,415,932 | 11/1983 | Rogers | 358/246 |

*Primary Examiner*—Howard W. Britton
*Attorney, Agent, or Firm*—John C. Fox

[57] ABSTRACT

A composite mounting structure for a cathode ray tube is described wherein L-shaped mounting brackets are secured along the corner regions of the peripheral skirt of the cathode ray tube face panel by a steel tension band, and wherein slippage of the brackets and tension band during severe thermal or mechanical shock is minimized by the inclusion of slip-resistant foam mounting blocks between the base portions of the mounting brackets and the glass skirt portion of the face panel.

3 Claims, 5 Drawing Figures

CATHODE RAY TUBE WITH COMPOSITE MOUNTING STRUCTURE

BACKGROUND OF THE INVENTION

This invention relates to a cathode ray tube mounting structure, and more particularly relates to a composite mounting structure integral with implosion-protective means.

Cathode ray tubes basically include a phosphor screen, at least one gun comprising an electron emitting cathode and one or more associated electrodes for focusing the emitted electrons into beams and directing the beams to the screen to excite the phosphors thereon, all in an air-evacuated glass envelope. Such envelope is normally comprised of a neck portion, containing the gun assembly, a funnel portion and a faceplate panel including a peripheral sidewall or skirt frit-sealed to the funnel. The screen is generally formed directly on the interior surface of the faceplate, and the gun is oriented along an axis normal to screen center, the so-called Z axis.

The panel skirt is commonly fitted with "implosion protection" means such as a steel tension band, to lessen the hazards surrounding tube breakage due, for example, to severe mechanical or thermal shock.

While the tube designer would prefer to have the panel skirt sidewalls parallel to the Z axis of the tube, in practice the panel is manufactured with a slight outward tilt of the skirt (for example, from 1° to 3°) in order to facilitate removal of the panel from the glass forming mold. This of course results in the tension band being placed on a sloping surface which Induces undesirable slippage. In some cases; a relatively thin fiber-reinforced double-sided adhesive tape has been used under the tension band to alleviate this slippage problem.

However, the tension band also often serves another purpose of providing mechanical support for tube mounting brackets or "ears" mounted at the corner regions of the panel skirt. The base portions of these generally L-shaped brackets are sometimes welded to the outer surface of the tension band (see, for example, U.S. Pat. No. 4,214,142), but are also often placed under the tension band (see, for example, U.S. Pat. Nos. 4,222,075 and 4,210,935).

When placed under the tension band, the ear bases aggravate the slippage problem, not only because they reduce the contact area between the panel skirt and the tension band, but also because their contour does not exactly fit the contour of the skirt in the corner regions. This latter condition sometimes creates a "skate effect" in which only the edges of the base are in contact with the glass, resulting in minimal resistance to slippage.

Of course, while this slippage problem could be significantly alleviated by welding the ears to the outside of the tension band, as taught in the prior art, such an approach would require complex jigging fixtures and welding equipment to obtain accurate positioning and secure attachment of the ears to the band in the desired corner locations. Thus, the tube designer is in search of a more cost effective method of alleviating the band slippage problem.

Accordingly, it is an object of the present invention to provide for a cathode ray tube mounting structure which allows the securing of the mounting brackets or ears directly on the skirt of the face panel under the tension band. It is a further object of the invention to provide for a composite mounting structure in which slippage of both the tension band and mounting brackets is substantially alleviated.

SUMMARY OF THE INVENTION

In accordance with the invention, a composite mounting structure for a cathode ray tube is provided, such structure including a tension band placed around the face panel skirt of a cathode ray tube, mounting brackets positioned in the corner regions of the face panel skirt under the tension band, and a layer of resilient material between the face panel skirt and the bases of the mounting brackets, said resilient material when in a state of compression providing intimate contact and a resistance to slippage between the glass surface of the face panel skirt and the metal surface of the bracket base.

In a preferred embodiment, such layer of resilient material is in the form of a pad placed directly under the bracket base. Such pad of resilient material, when placed in compression by application of the tension band over the top of the mounting bracket base, compresses sufficiently to conform to both the countours of the lower surface of such base and the mask panel skirt and also to any surface irregularities in such surfaces. Preferably such resilient material is a double-backed adhesive foamed material which adheres firmly both to the glass and metal surfaces and significantly reduces slippage not only of the mounting brackets themselves but also of the tension band, thus enhancing its implosion protection characteristics.

DETAILED DESCRIPTION OF THE INVENTION

Figure 1:
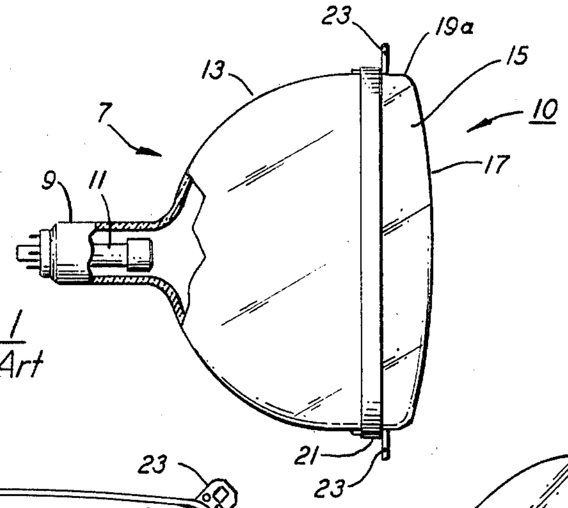
FIG. 1 Prior Art
FIG. 1 is a cutaway view of a typical cathode ray tube with implosion resistant tension band and associated mounting brackets.

Referring now to FIG. 1 of the drawing, an implosion-resistant cathode ray tube 10 includes evacuated envelope 7, having a neck portion 9 wherein is sealed an electron gun assembly 11 and which extends to a flared or funnel portion 13, and a face panel 15 which includes a substantially rectangular-shaped viewing portion 17 which extends to a skirted portion 19*a*. The skirted portion 19*a* is affixed to the flared or funneled portion 13, as by frit sealing, for example, and a metal tension band 21 encircles and exerts a compressive force on the skirt portion 19*a* of the face panel 15. Also, substantially L-shaped mounting brackets 23 are disposed intermediate the metal band 21 and the skirt portion 19*a* of face panel 15.

Figure 2:
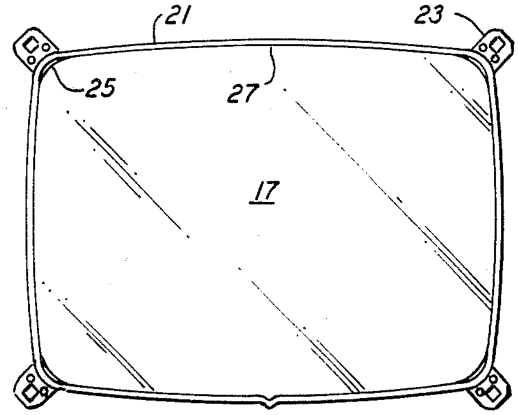
FIG. 2 Prior Art
FIG. 2 is a front elevation view illustrating the viewing portion of the face panel of the cathode ray tube in FIG. 1, with L-shaped bracket members secured under the tension band.
Figure 4:
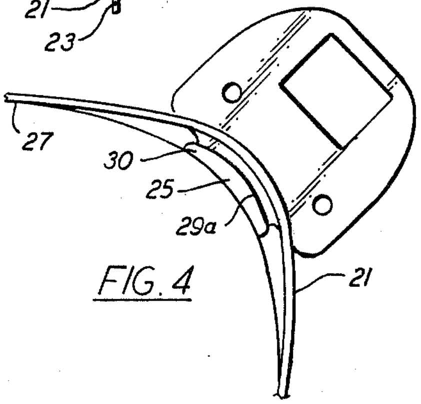
FIG. 4 is a front elevation view of an enlarged portion of a corner region of the viewing portion of the cathode ray tube face panel showing the composite mounting structure of the invention.

Referring now to FIG. 2, the viewing portion 17 of the face panel 15 is substantially rectangular shaped with corner portions 25 and substantially flattened portions 27 intermediate the corner portions 25. The metal band 21 encircles the viewing portion 17 and bracket mounting members 23 of a substantially L-shaped configuration are disposed intermediate the metal band 21 and the corner portion 25 on at least two and preferably all four of the corner portions 25.

Figure 3:
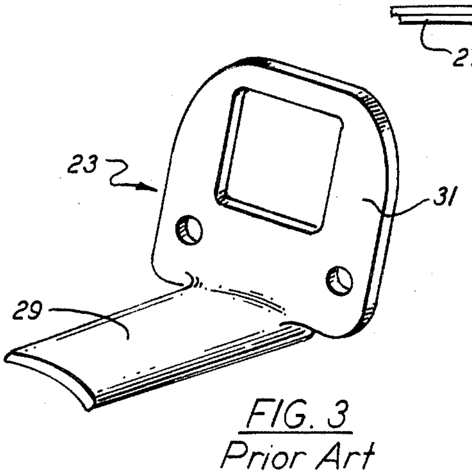
FIG. 3 Prior Art
FIG. 3 is a perspective view of a typical mounting bracket member.

More specifically, the substantially L-shaped bracket mounting member 23 illustrated in FIG. 3, includes a base portion 29 connected to an upstanding attachment portion 31. The base portion 29 is disposed intermediate the metal band 21 and a corner portion 25 of FIG. 2.

In fabricating the above-mentioned implosion-resistant cathode ray tube, an evacuated envelope is selected which has a face panel with a substantially rectangular shaped viewing portion which blends into a skirt portion with corners having a given radius of curvature. The skirt portion is encircled with a metal tension band which exerts a compressive force thereon. Also, a substantially L-shaped bracket member has a base portion which is disposed intermediate the metal band in at least two and preferably all four corner portions of the face panel.

The fabrication of the face panel by the glass manufacturer within certain tolerance limits, and the fabrication of the mounting bracket member also within certain tolerance limits, results in a statistical variability between the radius of curvature of the corner region 25 of the face panel and the bottom surface curvature of the base portion of the bracket member 29*a*. In practice, it has been found that such variations usually occur with the base portion of the bracket member having a greater radius of curvature than that of the corner region of the face panel skirt, thus resulting in minimal edge contact between the base portion of the bracket member and the panel skirt and in what has heretofore been referred to as the "skate effect".

Figure 5:
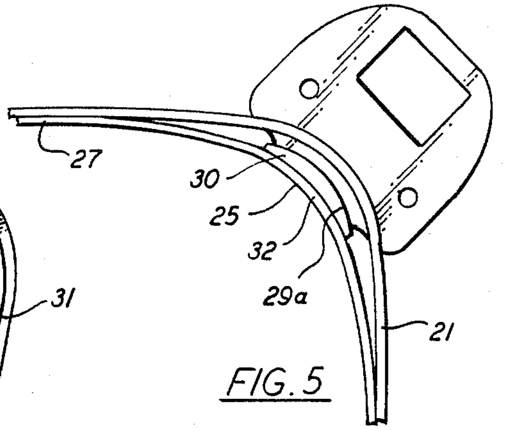
FIG. 5 is a front elevation view similar to that of FIG. 4 showing another embodiment of the composite mounting structure of the invention.

In accordance with the invention, a layer of resilient slippage resistant material 30 is placed between the panel skirt 19*a* and the base portion 29, whereby implacement of tension band 21 puts resilient material 30 in compression thus conforming to the various curvatures of the lower surface 29*a* of the bracket mounting base member 29 and the radius of curvature of the corner region 25 of the face panel skirt as well as to any irregularities in such surfaces. Preferably, such resilient material is in the form of a pad placed directly under the base portion 29 prior to implacement of the bracket member 31 and the tension band 21. Also, the resilient material surfaces are preferably of a slip-resistant character both in contact with the glass and the metal surfaces. A particularly suitable material has been found to be a double-backed adhesive foam material having an uncompressed thickness of approximately 1/32 to 3/32 of an inch. A surface coating of pressure sensitive adhesive enables protection of such surfaces until use by peelable and disposable paper overlays. Two examples of such materials are 3M 4022 and Permacell PE6DFR. Such resilient material may be used alone or in conjunction with the relatively thinner, relatively non-compressible double-backed adhesive fiber-reinforced tapes used under the tension band as taught in the prior art. For example, in such a combination, the double-backed fiber-reinforced tape 32 would be placed on the face panel skirt 19*a* encircling the skirt in the area under the tension band 21, the resilient slippage resistant material 30 would be placed over such fiber-reinforced tape 32, and the mounting bracket 23 and tension band 21 would be placed over these two materials as shown in FIG. 5. Such a composite structure, while not essential to the teachings of the invention herein, would be expected to have enhanced slippage resistance properties.

While the invention has been described in terms of a preferred embodiment of having a block of resilient material under the base portion of the mounting bracket, it will be appreciated by those skilled in the art that the resilient material may also be extended entirely or partially around the periphery of the face plate panel skirt to provide even further increased slippage resistance to the tension band.

Several tube samples were fabricated using the composite construction of the invention wherein a block of double-sided foam tape, 3M 4022, was placed directly under the base portions of all four mounting brackets. The tube samples were subjected to a standard drop test in which the tubes were mounted by means of the brackets inside a wooden box having an open side. In the test procedure, the box is raised automatically and then released for free-fall from a height to achieve an impact of approximately 30 times gravity. This is done successively on all six sides of the box in order to test strength of the mount from six different orientations of the tube. Typical results are given for 19" cathode ray tubes having a $\frac{3}{4}$" wide steel tension band with ears located on each of four corners of the face panel skirt. The results of five such tests were as follows: Test 1: No movement of band or ears; Test 2: Strap moved 1/32" toward face on anode side of tube; there was no ear movement; Test 3: Band moved 1/64" toward panel face on anode side of tube and 3 o'clock side of tube; there was no ear movement; Test 4: Band moved 1/64" toward tube neck: there was no ear movement: Test 5: No movement of band or ears.

Without the use of foam tape under the ears, severe slippage and even complete removal of the ears and band commonly occurs during such severe drop testing conditions.

I claim:

1. A cathode ray tube with a composite mounting structure, the tube comprising a glass face panel with four corner regions and a peripheral skirt portion integrally formed therewith, a metal tension band surrounding the face panel skirt and placing such skirt in mechanical compression, a fiber reinforced double-sided adhesive tape around the periphery of the face panel skirt under the tension band, and four L-shaped mounting brackets between the tape and the tension band, one bracket in each corner region of the face panel, each bracket comprising a base portion and an upstanding attachment portion, characterized in that said structure includes a resilient material located at least between the base portion of the mounting brackets and the relatively thinner, relatively non-compressive tape.

2. The structure of claim 1 wherein the resilient material includes slip-resistant surfaces in contact with both the glass face panel skirt and the base portion of the mounting bracket.

3. The composite structure of claim 2 in which the resilient material is a double-sided adhesive foam tape.

* * * * *